United States Patent Office 3,461,169
Patented Aug. 12, 1969

3,461,169
SOLVENT EXTRACTION OF POLYMERIC GLYCOLS USING ACETONITRILE
Burns Davis and Herbert Ralph Lyon, Kingsport, Tenn., assignors to Eastman Kodak Company, Rochester, N.Y., a corporation of New Jersey
No Drawing. Filed July 28, 1967, Ser. No. 656,646
Int. Cl. C08f 1/94
U.S. Cl. 260—611                    8 Claims

ABSTRACT OF THE DISCLOSURE

Polymeric glycol having a number average molecular weight of 600–12,000 such as poly(tetramethylene ether) glycol is extracted with acetonitrile to remove a lower molecular weight fraction containing molecules having a molecular weight below about 1,500. A repetitive batch type extraction process is useful, or the acetonitrile and polymeric glycol can be continuously contacted utilizing concurrent or countercurrent flow, or one phase can be passed through the other phase while it is retained in the extraction zone.

---

This invention relates to a method for extracting a lower molecular weight fraction from a polymeric glycol.

Fractionation processes for polymers are known in the art as illustrated in a book by J. C. Robb and F. W. Peaker, "Progress in High Polymers," vol. 1, pages 115–119, published by Heywood (London). This reference includes a description of various methods and useful extraction solvents. The fractionation of polyethylene glycol is described by K. E. Alwin in Acta Chemica Scandinavica, vol. 13, pages 1263–73 (1959). However, none of the prior art provides a basis for selecting especially useful extraction solvents for fractionating the polymeric glycols with which this invention is concerned.

Therefore, the discovery that acetonitrile is an unexpectedly useful and especially advantageous extraction solvent for poly(tetramethylene ether) glycols represents a significant and unobvious discovery, and constitutes an important technical advance in the art. These considerations represent the principal objects of this invention although other objects will appear elsewhere in this specification including the provision of advantageous repetitive or batch processes and continuous processes.

According to one aspect of this invention there is provided a method for removing a lower molecular weight fraction containing molecules having molecular weights below about 1,500 from a polymeric glycol having a number average molecular weight in the range of from about 600 to about 12,000 selected from the group consisting of poly(tetramethylene ether) glycol and copolymers thereof wherein up to about 25 mole percent of the tetramethylene radicals are replaced with aliphatic, alicyclic or aromatic bivalent hydrocarbon radicals, said process comprising A. Contacting one part by weight of the polymeric glycol with from about 1.5 to about 15 parts by weight of acetonitrile to form a primarily acetonitrile-containing phase of lighter density and a primarily polymeric glycol-containing phase of heavier density, and B. Removing the lighter density phase containing a lower molecular weight fraction of polymeric glycol.

The above method is normally followed by the further step of

C. Recovering a higher molecular weight fraction containing molecules having molecular weights above about 1,500 from the heavier density phase.

The last step C may not need to be performed if the presence of acetonitrile in the polymeric glycol will not adversely affect its intended use.

In a repetitive batch type process the method just described is performed wherein steps A and B are followed by step A' contacting the heavier density phase from step B with 1.5 to 15 parts by weight of acetonitrile and B' separating the mixture into the phases as in step B, said steps A' and B' being performed in the range of from one to 50 times prior to performing step C.

In performing such a process steps A' and B' are repeated no significant amount of the lower molecular weight fraction is removed with the lower density phase.

According to one type of continuous process using the above described method, step A is performed in an extraction zone containing the polymeric glycol which is retained therein while acetonitrile is continuously conducted therethrough until substantially all of the molecules are removed which have a molecular weight of less than about 1,500.

More generally stated, this invention provides a continuous method for removing a lower molecular weight fraction from a polymeric glycol selected from the group consisting of poly(tetramethylene ether) glycol and copolymers thereof wherein up to about 25 mole percent of the tetramethylene radicals are replaced with aliphatic, alicyclic or aromatic bivalent hydrocarbon radicals, said process comprising A. Continuously passing polymeric glycol through an extraction zone, B. Continuously passing acetonitrile through said extraction zone in contact with said polymeric glycol, C. Continuously removing an acetonitrile-containing phase which contains a lower molecular weight fraction of polymeric glycol, and D. Continuously removing the remaining polymeric glycol Such continuous processes can employ vertically or horizontally elongated extraction zones using vessels of various shapes and having inlets, outlets, decanters, centrifuges and other apparatus as is well known in the art and illustrated in the references cited hereinabove. The flow of polymeric glycol and extraction solvent can be concurrent or countercurrent, or one phase can be passed through the other phase while it is retained in the extraction zone. These details are not particularly essential to this invention which primarily concerns the discovery of unexpectedly advantageous attributes in employing acetonitrile for fractionating poly(tetramethylene ether)glycols including copolymers thereof. The process involves a liquid-liquid extraction in which acetonitrile is used to remove the lower molecular weight glycol from the higher molecular weight glycol. Acetonitrile is substantially immiscible with polytetramethylene glycols of about 2000 to 12,000 molecular weight or higher but will dissolve such glycols of up to about 1500 molecular weight and, therefore, can be used to essentially "dissolve-out" or extract the low molecular weight glycol of up to about 1,500 molecular weight. The molecular weight as referred to herein is the number average molecular weight.

It is well known in the art that polymers as prepared consist of a rather wide range of molecular weights and the value quoted as the molecular weight is an average of this wide range of molecular weights.

According to a more particular embodiment of this invention an extraction process can be carried out in simple laboratory equipment by a direct extraction batch process.

The direct extraction batch process involves mixing about 1.5 to 15 parts by weight of acetonitrile with one part of the polytetramethylene glycol to be extracted. The preferred ratio is about 2 to 7 parts of acetonitrile per part of glycol. Mixing is continued until an equilibrium is established between the acetonitrile phase and the glycol phase. The rate of formation of the equilibrium depends on several factors such as the rate of mixing and the molecular weight and molecular weight distribution of the glycol. A few trial runs in which a material balance is made to determine the amount of glycol in the glycol and acetonitrile layers followed by a molecular weight determination on the glycol from the two layers will generally provide information on the rate of formation of equilibrium. After equilibrium has been established the two phases are separated.

Separation can be accomplished by simply allowing the two phases to separate on standing. The lighter acetonitrile phase containing the low molecular weight glycol will form the top layer and the more dense viscous glycol phase will form the lower layer.

Other methods may be used to separate the phases such as a batch or continuous centrifuge. If separation is effected by allowing the phases to stand the two layers formed may be separated by decanting the upper acetonitrile layer. The process may be repeated for as many cycles as desired or until essentially all of the low molecular weight glycol up to about 1,500 molecular weight has been removed.

After the final extraction cycle the glycol layer will retain a small percentage of the acetonitrile. This can be removed by heating the glycol at a reduced pressure.

In addition to the homopolymer of polytetramethylene glycol, copolymers of this glycol may be used in which up to 25 mole percent of the tetramethylene units are replaced by aliphatic, alicyclic or aromatic hydrocarbon radicals. Glycols of from 600 to about 12,000 molecular weight may be used. This invention is most useful in the molecular weight range of about 1,500 to about 8,000.

Polytetramethylene glycols and copolymers thereof which are solids at room temperature may be caused to remain fluid by melting and mixing with about equal parts of acetonitrile. The glycol will retain sufficient acetonitrile to prevent it from solidifying on cooling to room temperature.

The amount of glycol extracted in each case will depend largely on the molecular weight of the glycol and the molecular weight distribution of the glycol.

In general the weight percent of low molecular weight glycol removed will decrease as the molecular weight of the glycol increases. For example, if a polytetramethylene glycol of about 1300 molecular weight is extracted, until essentially no more glycol can be removed from the glycol fraction, the low molecular weight fraction removed may constitute as much as about 40 to 60 weight percent of the original glycol. Extraction of a glycol of about 4000 molecular weight will result in the removal of low molecular weight glycol constituting about 5% to 20% by weight of the original glycol.

In general the weight percent removed will vary from about 2% for glycols of a high molecular weight of about 9000 to 12,000 to about 70% to 80% for low molecular weight glycols of about 600 to 1000 molecular weight.

The use of acetonitrile for extracting the low molecular weight glycol from polytetramethylene glycol is a very useful and unique process. It involves the use of only one solvent component which greatly simplifies the process of extraction, isolation of extracted product and isolation of extracting solvent. Polymer extraction processes often involve the use of two or more solvent components such as described by McConnell U.S. Serial No. 656,643, filed July 28, 1967 and by K. E. Alwin, Acta Chem. Scand. 13, 1263–1273, (1959).

Acetonitrile has a relatively low boiling point of 82° C. which makes it easily recoverable by distillation.

An especially valuable utility for the extracted polymeric glycols produced by this invention is described and claimed in Davis, Kibler and Lyon U.S. patent application, Ser. No. 656,739 filed on the same date as the present application.

This Davis et al. application is incorporated herein by reference since it provides additional background and utility data with respect to the present invention.

Another patent application to be incorporated herein by reference is W. V. McConnell Ser. No. 656,643 filed in the U.S. Patent Office on the same date as the present case. McConnell describes additional background information and techniques are illustrated which may be helpful in understanding and practicing the present invention.

Reference is also invited to copending U.S. patent application Ser. No. 417,856 filed on Dec. 14, 1964 by Stannin, Seaton and Gee which describes a method for manufacturing polymeric glycols having a narrow molecular weight distribution. The present invention is primarily concerned with treating commercially produced polymeric glycols which have a relatively wide distribution of molecular weights of those molecules in a polymer having a given number average molecular weight. On the other hand, this invention can also be used to remove a lower molecular weight fraction from a polymer even when it has a relatively narrow distribution of molecular weights.

This invention can be further illustrated by the following examples of preferred embodiments although it will be understood that these examples are included merely for purposes of illustration and are not intended to limit the scope of the invention unless otherwise specifically indicated.

Example I

A copolyether glycol is prepared according to U.S. application Ser. No. 231,588 from tetrahydrofuran and 8-oxabicyclo[4.3.0]nonane and contains about 8.0 mole percent of the nonane.

The lower molecular weight fraction from 1,000 gm. of the copolyether glycol is removed by first adding to the glycol 2,340 g. of acetonitrile as an extracting solvent, the mixture being stirred vigorously for 45 min. The stirring is then stopped and, after the layers have separated, the acetonitrile layer is withdrawn. The extraction procedure is repeated twice more using 2,340 g. portions of acetonitrile each time.

The extracted copolyether glycol layer is then heated at 120°–150° C. at 0.2 mm. of mercury pressure for 2 hr. to remove the acetonitrile which has been withheld in this layer. The acetonitrile extracts are combined and, after stripping most of the extracting solvent, the lower molecular weight extract is heated at 120°, 150° C. (0.2 mm.) to complete the solvent removal. The glycol fractions are characterized in Table 1.

TABLE 1

| | Quantity of fraction, percent | Number average molecular weight |
|---|---|---|
| Polymeric glycol, prior to extraction | 100 | 4,100 |
| Low molecular weight extract | 7.3 | 1,150 |
| Residual polymeric glycol, after extraction | 92.7 | 5,350 |

Example II

A copolyether glycol having a molecular weight of 3400 is prepared according to U.S. application Ser. No. 231,588 from tetrahydrofuran and 8-oxabicyclo[4.3.0] nonane and contains about 6.8 mole percent of the nonane. The glycol is extracted 3 times using 2.34 g. of acetonitrile per gram of the glycol for each extraction and using the procedure described in Example I. After extraction acetonitrile remaining in the glycol phase is removed under heat and reduced pressure. Determination of the molecular weight of the extracted glycol gave a value of 4300.

Examples III and IV

Two glycols having different molecular weights are extracted as described in Example I. Table 2 shows the results of these extractions.

TABLE 2

| Example Number | Glycol | Glycol molecular weight | |
|---|---|---|---|
| | | Before extraction | After extraction |
| III | Polytetramethylene glycol | 3,900 | 4,950 |
| IV | Polytetramethylene-1,2-cyclohexylene-dimethylene glycol.* | 7,500 | 8,300 |

*This glycol contains about 12 mole percent of the 1,2-cyclohexylene-dimethylene units (derived from 8-oxabicyclo[4.3.0]nonane.

Example V 2,000 g. of polytetramethylene glycol of an average molecular weight of 2,700 is extracted once with 4,800 g. of acetonitrile. The slurry is allowed to stand 48 hours during which time two layers form. The two layers are separated. 390 g. of acetonitrile remain in the glycol layer. The amount of glycol in each layer along with the molecular weight is determined. Results are shown in Table 3.

TABLE 3

| | Quantity of fraction, percent | Number average molecular weight |
|---|---|---|
| Polymeric glycol, prior to extraction | 100 | 2,700 |
| Low molecular weight extract | 8.5 | 900 |
| Residual polymeric glycol, after extraction | 91.5 | 3,000 |

Example VI

In this example the low molecular weight glycol is continuously extracted from a 4,000 molecular weight polytetramethylene glycol.

The original glycol, which is a solid at room temperature, is prepared for extraction by melting and saturating with acetonitrile to prevent solidification on cooling to room temperature. The amount of acetonitrile required for this is equal to about 25% by weight of the glycol used. The acetonitrile-glycol slurry is cooled to room temperature and poured into a cylinder containing glass beads of about 4–5 mm. in diameter. Sufficient glass beads are used to insure that the level of the beads is higher than that of the glycol phase. The cylinder also contains sufficient acetonitrile to fill voids between the beads. The cylinder is fitted with an inlet at the bottom leading to a reservoir placed at a level of 40 to 50 in. higher than that of the glass beads in the cylinder and an outlet near the top of the cylinder at a level of 4 or 5 in. above the top of the beads. The slurry on being poured into the cylinder displaces the acetonitrile filling the voids between the beads.

The actual extraction process is carried out by allowing an amount of acetonitrile equal 4 times that of the weight of the glycol to flow from the reservoir into the inlet at the bottom of the cylinder at a rate of about 1 ml. per minute. The acetonitrile having a lower density than that of the glycol phase passes through the glycol phase and in so doing dissolves and removes the lower molecular weight glycol from the high molecular weight glycol. The acetonitrile phase, containing low molecular weight glycol, is recovered at the outlet above the glass beads. After extraction the glycols from the two phases are then isolated and the amount of each and molecular weights determined. Results are shown in Table 4.

TABLE 4

| | Quantity of fraction, percent | Number average molecular weight |
|---|---|---|
| Polymeric glycol, prior to extraction | 100 | 4,000 |
| Low molecular weight extract | 9.5 | 1,278 |
| Residual polymeric glycol, after extraction | 90.5 | 5,200 |

The invention has been described in detail with particular reference to preferred embodiments thereof, but it will be understood that variations and modifications can be effected within the spirit and scope of the invention as described hereinabove and as defined in the appended claims.

We claim:
1. A method for removing a lower molecular weight fraction containing molecules having molecular weights below about 1,500 from a polymeric glycol having a number average molecular weight in the range of from about 600 to about 12,000 selected from the group consisting of poly(tetramethylene ether) glycol and a copolymer of tetrahydrofuran and 8-oxabicyclo[4.3.0]nonane, said process comprising
   (A) contacting one part by weight of the polymeric glycol with from about 1.5 to about 15 parts by weight of acetonitrile to form a phase of lighter density and a phase of heavier density, and
   (B) removing the lighter density phase containing a lower molecular weight fraction of polymeric glycol.
2. The method of claim 1 wherein there is performed a further step as follows:
   (C) recovering a higher molecular weight fraction containing molecules having molecular weights above about 1,500 from the heavier density phase.
3. The method of claim 2 wherein steps (A) and (B) are followed by step (A') contacting the heavier density phase from step (B) with 1.5 to 15 parts by weight of acetonitrile and (B') separating the mixture into two phases as in step (B), said steps (A') and (B') being performed in the range of from one to 50 times prior to performing step (C).
4. The method of claim 3 wherein steps (A') and (B') are repeated until no significant amount of the lower molecular weight fraction is removed with the lower density phase.
5. The method of claim 1 in which step (A) is performed in an extraction zone containing the polymeric glycol which is retained therein while acetonitrile is continuously conducted therethrough until substantially all of the molecules are removed which have a molecular weight of less than about 1,500.
6. The method of claim 1 wherein the polymeric glycol is poly(tetramethylene ether) glycol.
7. The method of claim 1 wherein the polymeric glycol is a copolymer of 85–99 mole percent tetrahydrofuran and 15–1 mole percent of 8-oxabicyclo[4.3.0] nonane.
8. A continuous method for removing a lower molecular weight fraction from a polymeric glycol selected from the group consisting of poly(tetramethylene ether) glycol and a copolymer of tetrahydrofuran and 8-oxabicyclo[4.3.0]nonane, said process comprising
   (A) continuously passing polymeric glycol through an extraction zone,
   (B) continuously passing acetonitrile through said extraction zone in contact with said polymeric glycol, wherein from about 1.5 to about 15 parts by weight of acetonitrile is used for each part by weight of polymeric glycol,
   (C) continuously removing an acetonitrile-containing phase which contains a lower molecular weight fraction of polymeric glycol, and
   (D) continuously removing the remaining polymeric glycol.

References Cited

UNITED STATES PATENTS

| 2,751,419 | 6/1956 | Hill et al. |
| 3,358,042 | 12/1967 | Dunlop et al. |
| 3,359,332 | 12/1967 | Johnston. |
| 2,929,804 | 3/1960 | Steuber. |

BERNARD HELFIN, Primary Examiner

HOWARD T. MARS, Assistant Examiner

U.S. Cl. X.R.

210—21; 260—613, 615

PO-1050
(5/69)

UNITED STATES PATENT OFFICE
CERTIFICATE OF CORRECTION

Patent No. 3,461,169  Dated August 12, 1969

Inventor(s) Burns Davis and Herbert Ralph Lyon

It is certified that error appears in the above-identified patent and that said Letters Patent are hereby corrected as shown below:

Column 2, line 5, "the" should read ---two---. Column 2, line 9, the word ---until--- should be inserted before the word "no". Column 4, line 44, "120°,150°C." should read ---120°-150°C.---.

SIGNED AND
SEALED
JAN 20 1970

(SEAL)
Attest:

Edward M. Fletcher, Jr.
Attesting Officer

WILLIAM E. SCHUYLER, JR.
Commissioner of Patents